(12) United States Patent
Andreasson et al.

(10) Patent No.: US 8,480,986 B2
(45) Date of Patent: *Jul. 9, 2013

(54) CATALYTIC REDUCTION OF $NO_x$

(75) Inventors: Anders Andreasson, Västra Frölunda (SE); Guy Richard Chandler, Cambridge (GB); Claus Friedrich Goersmann, Royston (GB); James Patrick Warren, Cambridge (GB); Georg Huethwohl, Soest (DE)

(73) Assignees: Daimler AG, Stuttgart (DE); HJS Fahrezeutechnik GmbH & Co. KG, Menden (DE); Johnson Matthey Public Ltd. Co., Royston (GB)

( * ) Notice: Subject to any disclaimer, the term of this patent is extended or adjusted under 35 U.S.C. 154(b) by 0 days.

This patent is subject to a terminal disclaimer.

(21) Appl. No.: 13/204,634

(22) Filed: Aug. 5, 2011

(65) Prior Publication Data

US 2011/0286903 A1  Nov. 24, 2011

Related U.S. Application Data

(60) Continuation of application No. 12/380,414, filed on Feb. 27, 2009, now Pat. No. 8,142,747, which is a continuation of application No. 10/886,778, filed on Jul. 8, 2004, now Pat. No. 7,498,010, which is a division of application No. 09/601,964, filed as application No. PCT/GB99/00292 on Jan. 28, 1999, now abandoned.

(30) Foreign Application Priority Data

Feb. 6, 1998  (GB) .................................. 9802504.2

(51) Int. Cl.
B01D 53/56 (2006.01)
(52) U.S. Cl.
USPC ......................................... 423/239.1; 60/274
(58) Field of Classification Search
USPC .... 423/213.2, 213.5, 239.1; 60/274; 422/171, 422/172, 177, 180
See application file for complete search history.

(56) References Cited

U.S. PATENT DOCUMENTS

| | | |
|---|---|---|
| 3,771,967 A | 11/1973 | Nowak |
| 4,093,423 A | 6/1978 | Neumann |
| 4,163,042 A | 7/1979 | Lynch |
| 4,231,338 A | 11/1980 | Sugasawa et al. |
| 4,278,639 A | 7/1981 | Tadokoro et al. |
| 4,351,811 A | 9/1982 | Matsuda et al. |
| 4,406,126 A | 9/1983 | Yokokura et al. |
| 4,534,173 A | 8/1985 | Tsukamoto |
| 4,735,927 A | 4/1988 | Gerdes et al. |
| 4,778,665 A | 10/1988 | Krishnamurthy et al. |
| 4,854,123 A | 8/1989 | Kobayashi et al. |
| 4,902,487 A | 2/1990 | Cooper et al. |
| 4,912,776 A | 3/1990 | Alcorn |
| 4,916,106 A | 4/1990 | Koschlig et al. |
| 4,919,905 A | 4/1990 | Horaguchi et al. |
| 4,961,917 A | 10/1990 | Byrne |
| 5,041,270 A | 8/1991 | Fujitani et al. |
| 5,050,376 A | 9/1991 | Stiglic et al. |
| 5,116,586 A | 5/1992 | Baacke et al. |
| 5,120,695 A | 6/1992 | Blumrich et al. |
| 5,209,062 A | 5/1993 | Vollenweider |
| 5,224,334 A | 7/1993 | Bell |
| 5,369,956 A | 12/1994 | Daudel et al. |
| 5,417,949 A | 5/1995 | McWilliams et al. |
| 5,422,085 A | 6/1995 | Bell et al. |
| 5,440,880 A | 8/1995 | Ceynow et al. |
| 5,451,387 A | 9/1995 | Farnos et al. |
| 5,473,887 A | 12/1995 | Takeshima et al. |
| 5,482,692 A | 1/1996 | Audeh et al. |
| 5,523,068 A | 6/1996 | Yang et al. |
| 5,534,237 A | 7/1996 | Yoshida et al. |
| 5,564,283 A | 10/1996 | Yano et al. |
| 5,628,186 A | 5/1997 | Schmelz |
| 5,670,443 A | 9/1997 | Irite et al. |
| 5,711,147 A | 1/1998 | Vogtlin et al. |
| 5,711,149 A | 1/1998 | Araki |
| 5,746,989 A | 5/1998 | Murachi et al. |
| 5,753,188 A | 5/1998 | Shimoda et al. |

(Continued)

FOREIGN PATENT DOCUMENTS

| | | |
|---|---|---|
| DE | 28 32 002 | 1/1979 |
| DE | 33 37 903 | 5/1985 |

(Continued)

OTHER PUBLICATIONS

R H. Hammerle; D. Ketcher; R. W. Horrocks; G. Lepperhoff; G. Huthwohl; and B. Luers, "Emissions from Diesel Vehicles with and without Lean NOx and Oxidation Catalysts and Particulate Traps," SAE Technical Paper Series, Paper No. 952391, Copyright 1995 Society of Automotive Engineers, Inc., pp. 197-215.

Memorandum from HJS Fahrzeugtechnik GmbH & Co. dated Aug. 30, 1996, regarding visit to PESAG, Paderborn, Aug. 28, 1996.

Letter from HJS Fahrzeugtechnik GmbH & Co. to Siemens AG dated Jan. 7, 1997.

Letter from HJS Fahrzeugtechnik GmbH & Co. to SKW Stickstoffwerke Piesteritz Gmbh dated Feb. 12, 1997.

Memorandum from HJS Fahrzeugtechnik GmbH & Co. dated Jun. 23, 1997, regarding SCR—Project discussion with the VDV on Jul. 23, 1997.

Meeting minutes of a discussion on Jul. 21, 1997, and an associated Annex.

(Continued)

Primary Examiner — Edward Johnson
(74) Attorney, Agent, or Firm — Brummett TechLaw PLLC

(57) ABSTRACT

A system for $NO_x$ reduction in combustion gases, especially from diesel engines, incorporates an oxidation catalyst to convert at least a portion of NO to $NO_2$, tparticulate filter, a source of reductant such as $NH_3$ and an SCR catalyst. Considerable improvements in $NO_x$ conversion are observed.

52 Claims, 4 Drawing Sheets

U.S. PATENT DOCUMENTS

| | | | |
|---|---|---|---|
| 5,809,774 | A | 9/1998 | Peter-Hoblyn et al. |
| 5,855,854 | A | 1/1999 | Shinzawa et al. |
| 5,968,464 | A | 10/1999 | Peter-Hoblyn et al. |
| 8,142,747 | B2 * | 3/2012 | Andreasson et al. ...... 423/239.1 |

FOREIGN PATENT DOCUMENTS

| | | |
|---|---|---|
| DE | 40 32 085 | 4/1992 |
| DE | 42 17 552 | 8/1993 |
| DE | 4314896 | 11/1993 |
| DE | 4435103 | 4/1996 |
| DE | 196 18 397 | 11/1997 |
| DE | 197 20 209 | 6/1998 |
| DE | 198 27 678 | 12/1999 |
| DE | 199 12 374 | 3/2000 |
| DE | 201 19 514 | 2/2002 |
| EP | 283452 | 9/1888 |
| EP | 0 283 913 | 9/1988 |
| EP | 319299 | 6/1989 |
| EP | 0 341 832 | 11/1989 |
| EP | 487886 | 6/1992 |
| EP | 515857 | 12/1992 |
| EP | 560991 | 9/1993 |
| EP | 580389 | 1/1994 |
| EP | 593790 | 4/1994 |
| EP | 615777 | 9/1994 |
| EP | 0 628 706 | 12/1994 |
| EP | 664147 | 7/1995 |
| EP | 0 758 713 | 2/1997 |
| EP | 0 806 553 | 11/1997 |
| EP | 955080 | 11/1999 |
| EP | 1065352 | 1/2001 |
| EP | 1147801 | 10/2001 |
| EP | 1194681 | 4/2002 |
| EP | 1251249 | 10/2002 |
| GB | 1014498 | 12/1965 |
| GB | 2134407 | 8/1984 |
| JP | 57-171425 | 10/1982 |
| JP | 59-87220 | 5/1984 |
| JP | 63-38620 | 3/1988 |
| JP | 63-236522 | 10/1988 |
| JP | 1-318715 | 12/1989 |
| JP | H1-318715 | 12/1989 |
| JP | 5-31327 | 2/1993 |
| JP | 5-65817 | 3/1993 |
| JP | 05214923 A | 8/1993 |
| JP | H05-214923 A | 8/1993 |
| JP | 6159037 | 6/1994 |
| JP | 7-119445 | 5/1995 |
| JP | 8-103636 | 4/1996 |
| JP | 8-281061 | 10/1996 |
| JP | 8-509795 | 10/1996 |
| JP | H08-257409 | 10/1996 |
| JP | 8-338320 | 12/1996 |
| JP | 9-53442 | 2/1997 |
| JP | 9-88727 | 3/1997 |
| JP | 92-06559 | 8/1997 |
| WO | WO 90/13362 | 11/1990 |
| WO | WO 96/01689 | 1/1996 |
| WO | WO 97/36676 | 9/1997 |
| WO | WO 97/43528 | 11/1997 |
| WO | WO 99/09307 | 2/1999 |
| WO | WO 99/39809 | 8/1999 |
| WO | WO 99/44725 | 9/1999 |
| WO | WO 00/72965 | 12/2000 |
| WO | WO 01/04466 | 1/2001 |
| WO | WO 02/14657 | 2/2002 |
| WO | WO 02/41991 | 5/2002 |

OTHER PUBLICATIONS

Letter (grant application) from Leipziger Verkehrsbetriebe (LVB) GmbH to Sachen State Ministry for Economics and Employment, Transport Department, dated Oct. 1, 1997, and Annex entitled "Project description 'Low-pollution bus drives'."

Dr.-Ing. Georg Huthwohl, Dr. Bernd Maurer, and Dipl.-Ing. H. Th. Vogel, Menden, "Emissionen von Dieselmotoren," Der Nahverkehr, 7-8, 97, pp. 22-27.

P. Rodenbuesch, "<<CRT>> und <<SINOx>> zur Senkung von Lastwagenabgasen," Autotecknik, 45 (1996), p. 17.

Paul Zelenka, Wolfgang Cartellieri, and Peter Herzog, "Worldwide diesel emission standards, current experiences and future needs," Applied Catalysis B: Environmental, vol. 10, 1996, pp. 3-28.

Jan G. M. Brandin, Lars A. H. Andersson, and C. U. Ingemar Odenbrand, "Catalytic Reduction of Nitrogen Oxides on Mordenite: Some Aspect on the Mechanism," Catalysis Today, vol. 4 (1989), pp. 187-203.

P. Hawker; N. Myers; G. Huthwohl; H. Th. Vogel; B. Bates; L. Magnusson; and P. Bronnenberg, "Experience with a New Particulate Trap Technology in Europe," SAE Paper No. 970182, Copyright 1997 Society of Automotive Engineers, Inc.

Letter from Saxony State Ministry for Commerce and Employment to Leipzig Verkehrsbetriebe (LVB) GmbH, dated Dec. 5, 1997.

E. J. Janssen, "Environmental Catalysis—Stationary Sources," Handbook of Heterogeneous Catalysis, G. Ertl, H. Knozinger, and J. Weitkamp (editors), .COPYRGT. VCH Verlagsgesellachaft mbH, D-69451 Weinheim (Federal Republic of Germany), 1997, pp. 1633-1644.

International Search Report of PCT/GB99/00292 dated May 21, 1999.

British Patent Office Search Report of priority application No. 9802504.2 dated Jun. 8, 1998.

SAE Technical Paper Series—"Improved SCR Systems for Heavy Duty Applications" printed for SAE World Congress, Mar. 6-9, 2000.

H. Mishma et al.; "Selective catalytic reduction of NO with NH3 over natural zeolites and its application to stationary diesel engine exhaust" dated Jun. 14, 1998.

Kasaoka et al.; "Effect of Inlet NO/NO2 Molar Ratio and Contribution of Oxygen in the Catalytic Reduction of Nitrogen Oxides with Ammonia" dated Apr. 1977.

Odenbrand et al.; Catalysis Today, 4 155-172 (1989)— "Dealuminated Mordenites as Catalysts in the Oxidation and Decomposition of Nitric Oxide and in the Decomposition of Nitrogen Dioxide: Characterization and Activities".

Kato et al.; Journal of Physical Chemistry, vol. 85, No. 26, (1981)— "Reaction Between NOx and NH3 on Iron Oxide-Titanium Oxide Catalyst".

Seiyama et al.; Journal of Catalysis 48, 1-7 (1977)—"Catalytic Activity of Transition Metal Ion Exchanged Y Zeolites in the Reduction of Nitric Oxide with Ammonia".

Centi et al.; Research on Chemical Intermediates, 17 125-135 (1992)—"Role of the Nature of Copper Sites in the Activity of Copper-Based Catalysts for NO Conversion".

Third Party Observation filed in JP-2000-530293 on Jan. 10, 2007 with full English translation.

Third Party Observation filed in JP 2000-530293 on Jan. 30, 2007 with full English translation.

Third Party Observation filed in JP 2000-530293 on Jun. 19, 2007 with full English translation.

Opposition filed in EP 1054722 by DaimlerChrysler on Sep. 5, 2002 (in German) with full English translation.

Opposition filed in EP 1054722 by OMG AG & Co. KG on Sep. 4, 2002.

Response to Oppositions of EP 1054722 filed by Johnson Matthey on Jun. 17, 2003.

Reply to Response to Oppositions of EP 1054722 filed by DaimlerChrysler on Jul. 28, 2003 (in German) with English translation.

Reply to Response to Oppositions of EP 1054722 filed by Umicore AG & Co. KG (formerly OMG AG & Co. KG) on Sep. 22, 2004.

Response to Summons to Attend Oral Proceedings for EP 1054722 submitted by Johnson Matthey to the European Patent Office on Sep. 5, 2007.

Response to Summons to Attend Oral Proceedings for EP 1054722 submitted by Umicore AG & Co. KG to the European Patent Office on Sep. 12, 2007.

SAE Paper 952391; "Emissions from Diesel Vehicles with and without Lean NOx and Oxidation Catalysts and Particulate Tape," Oct. 1995.

File memorandum from the HJS Company regarding a visit to PESAG on Aug. 28, 1996 with English translation.

Letter from the HSJ Company to Siemens AG on Jan. 7, 1997 with English translation.
Letter from the HJS Company to SKW Stickstoffwerke from Feb. 12, 1997 with English translation.
File memorandum from the HJS Company regarding a project discussion on Jun. 23, 1997 and an attachment with English translation.
Discussion minutes of a discussion on Jul. 21, 1997 and a corresponding disclosure with English translation.
Letter (grant application) from LVB to the Saxon State Ministry for Labor and Commerce of Jan. 10, 1997 with enclosure "Project description" with English translation.
Huthwohl, Maurer, Vogel; "Emissions from Diesel Engines," Der Nahverkehr, 7-8, 1997 with English translation.
P. Rodenbuesch, "'CRT' and 'SINOx' for reducing truck exhaust gases," Autotechnik, 45 with English translation.
"Worldwide diesel emission standards, current experiences and future needs." P. Zelenka et al., Applied Catalysis B: Environmental 10 (1998) 3-28.
"Catalytic reduction of nitrogen oxides on mordenite. Some aspect on the mechanism," J.G.M. Brandin et al., Catalysis Today, 4 (1989), 187-203.
SAE 970182, Hawker, P., et al., "Experience with a New Particulate Trap Technology in Europe," 1997.
SAE 890404, Cooper, BJ and Thoss, JE, "Role of NO in Diesel Particulate Emission Control", International Congress and Exposition, Detroit, Michigan, pp. 171-183 (Feb. 27-Mar. 3, 1989).
Letter (regarding funding) from LVB to the Saxon State Ministry for Labor and Commerce of May 12, 1997 with English translation.
Muller-Hellmann, I., et al., "The Future of Bus Propulsion Technology," Der Nahvehkehr (Local Traffic), May 1998, with English translation.
Correspondence from Skarupke to Boegner at DaimlerChrysler on Aug. 30, 2002 with English Translation.
Witness Statement of H.T. Vogel on Mar. 9, 2005 with English translation.
Witness Statement of T.J. Benstead on Sep. 9, 2005.
Presentation titled "The New SCRT System: A Combination of a SCR-Catalyst and CRT Trap System" from a meeting between HJS and Johnson Matthey on May 27, 1997.
Witness Statement of R.D. O'Sullivan on Sep. 8, 2005.
SAE 86007, Engler, B. et al., "Catalytically Activated Diesel Particulate Traps-New Development and Applications," Feb. 24-28, 1986.
Opposition of EP 1147801B submitted by Johnson Matthey to the European Patent Office on Jun. 14, 2007.
Response to Opposition of EP 1147801B submitted by Umicore AG & Co. KG to European Patent Office on Feb. 28, 2006.
Reply to Summons to Attend Oral Proceedings for EP 1147801B submitted by Johnson Matthey to the European Patent Office on Oct. 13, 2006.
Reply to Summons to Attend Oral Proceedings for EP 1147801B submitted by Umicore AG & Co. KG to the European Patent Office on Oct. 16, 2006.
Response to Umicore's Reply to Summons to Attend Oral Proceedings for EP 1147801B submitted by Johnson Matthey to the European Patent Office on Oct. 19, 2006.
Interlocutory decision by the Chairman in the Opposition Proceedings for EP 11478018 on Dec. 1, 2006.
Grounds of Appeal by Johnson Matthey filed on Apr. 5, 2007 in the European Opposition Proceedings for EP 1147801B.
J.G.M. Brandin, et al., "Catalytic Reduction of Nitrogen Oxides on Mordenite—Some Aspect on the Mechanism," Catalysis Today, 4 (1989), 187-203.
Long, R. Q. and Yang, R. T., "Superior Fe-ZSM-5 Catalyst for Selective Catalytic Reduction of Nitric Oxide by Ammonia," J. Am. Chem. Soc., 121 (1999), 5595-5596.
Long R.Q. and R.T. Yang, "Catalytic Performance of Fe-ZSM-5 Catalysts for Selective Catalytic Reduction of Nitric Oxide by Ammonia," J. Cat., 188 (1999) 332-339.
Search Results from Prior Art Search which includes English language abstracts.
Dolling, W., Mathes, W., "The SINOx diesel catalyst. The promising diesel exhaust gas cleaning system for trucks." Technische Ueberwachung (Duesseldorf), 38(7/8), 16-19, 1997 (German language document) with English Abstract.
Hums, E., "Standstill in advanced SCR technology? A provocation for the academic community and catalyst manufacturers," Preprints—American Chemical Society, Division of Petroleum Chemistry, 42(4), 778-780, 1997.
Lange, F.C., et al., "Infrared-spectroscopic investigations of selected catalytic reduction catalysts poisoned with arsenic oxide," Applied Catalysis, B: Environmental, 8(2), 245-265, 1996.
Hums, E. and Spitznagel, G.W. "Deactivation behavior of SCR DeNOx catalysis-basis for the development of a new generation of catalysts," Preprints—American Chemical Society, Division of Petroleum Chemistry, 39(1), 130-6, 1994.
Hilbrig, F., et al., "Acidity of tungsten oxide/titania catalysts for selective catalytic reduction (SCR)," Studies in Surface Science and Catalysis, 75 (New Frontiers in Catalysis, Pt. B.), 1351-62, 1993.
Brief of Daimler Chrysler AG filed with Munich Regional Court 1, Munich, Germany, on Sep. 12, 2005 (Document A of Protest) with full English translation.
Protest Under 37 CFR 1.291(a) by BASF, filed on Jan. 30, 2007.
Jacob, E., et al., "Reduction of NOx from HD Diesel Engines with Urea SCR Compact Systems (Controlled Diesel Catalyst)," Vienna Motor Symposium, May 7-May 8, 1998, 366-386 with English Abstract.
SAE 952489, Litorell, M., et al. "Development of Test Methods for Lean NOx Catalysts Evaluation," Oct. 16-19, 1995, pp. 1-8.
Tuenter, et al., "Kinetics and mechanism of the NOx reduction with NH3 on V2O5-WO3-TiO2 catalyst". Ind. Eng. Chem. Prod. Res. Dev., 25, 1986, 633.
Hans Bosch and Frans Jannsen, "Catalytic Reduction of Nitrogen Oxides—A Review of the Fundamentals and Technology" Catalysis Today, vol. 2, No. 4, Mar. 1988, article which includes pp. 457-487 (Chapter 5).
Heck, R.M., and Farrauto, R.J. "Selective Catalytic Reduction of NOx" Catalytic Air Pollution Control: Commercial Technology, 1995, published by John Wiley & Sons, pp. 156-167.
Garcin, E., et al., "Optimal NOx removal in chemical plants with the HEA-DCN process," Catalysis Today, 17 (1993), 311-324.
Notice of Withdrawal of Complaint filed by DaimlerChrysler with the Munich Regional Court dated Sep. 28, 2006.
Patent Assignment Abstract of Title re: U.S. 6,805,849.
Patent Assignment Abstract of Title re: U.S. 2004/0258594.
Assignment document dated Mar. 13, 2006.
Long, R.Q., Yang, R.T., "Selective Catalytic Reduction of NO with Ammonia over Fe3+-Exchanged Mordenite (Fe-MOR): Catalytic Performance, Characterization, and Mechanistic Study," Journal of Catalysis (2002), 207(2), pp. 274-285.
Long, R.Q., Yang, R.T., "Selective Catalytic Oxidation (SCO) of Ammonia to Nitrogen over Fe-Exchanged Zeolites," Journal of Catalysis (2001), 201(1), pp. 145-152.
Dr. Ing.D. Schoppe, et al., "A Controlled Exhaust Gas Aftertreatment System to Fulfill Future Emission Limits for Passenger Car Diesel Engines," International Vienna Motor Symposium, Apr. 25-26, 1996, Band 1, Fortschritt-Berichte VDI, Reihe 12, Nr. 267, 332-353 (in German) with English translation.
B. Maurer dissertation titled NOx-Verminderung nach dem SCR-Verfahren mit Hilfe von stickstoffhaltigen Reduktionsmitteln, on Apr. 24, 1997 (in German) with English translation.
European Search Report dated Jul. 5, 2001 in EP 011108785 (in German).
Submission by Johnson Matthey to the EPO on Sep. 12, 2007 in response to the late filed documents by Opponent II in the EPO Opposition to EP 1054722 B1.
Submission by Johnson Matthey to the EPO on Oct. 17, 2007 in response to the Summons to attend Oral Proceedings for EPO Opposition to EP 1054722 B1.
Minutes, including decision to reject the opposition, from the oral proceedings before the Opposition Division for EP 1054722 B1 on Nov. 12, 2007.
Umicore's Appeal of the Opposition Division Decision in Opposition Proceeding for EP, 1,147,801 filed Apr. 10, 2007 before the Technical Board.

Johnson Matthey's Response to Umicore's Appeal in Opposition Proceeding for EP 1,147,801 filed Oct. 8, 2007 before the Technical Board.
Umicore's Reply to Johnson Matthey's Response to Umicore's Appeal of the Opposition Division Decision in Opposition Proceeding for EP 1,147,801 filed Nov. 5, 2007 before the Technical Board.
UK Search Report for GB 9717034.4 (priority application for WO 99/09307).
Investitionen Zur Verminderung Von Umweltbelastungen; Programm Des Bundesministeriums fur Umwelt, Naturschutz and Reaktorsicherheit, Abschlu.beta.bericht 50441 Apr. 1982, Jul. 1997 (with full English language translation).
Schadstoffarmer Antrieb fur den Nahverkehr der Zukunft durch neue Filtersysteme in Paderborn, Bus & Bahn Apr. 1998, pp. 13-15 (with full English language translation).
Maurer, Dieselmotoren schadstoffarm betreiben, TuBd. 39 (1998) Nr. 7/8-Juli/August, pp. 18-20 (with full English language translation).
SAE 930363: "Off-Highway Exhaust Gas After-Treatment: Combining Urea-SCR, Oxidation Catalyst and Traps," by Hug, H.T., et al., Mar. 1-5, 1993.
Umwelt-Materialien Nr. 79, Luft; Moglichkeiten des technischen Umweltschutzes beim offentichen Strassenverkehr 1997, pp. 1-86 (in German) with full English language translation.
Koser, H. SCR-DeNOx-Katalysatoren Qualitatssicherung, Beurteilung und neue Entwicklungen, Haus der Technik Fachbuchreihe, SCR 08322 (in German) with full English language translation.
Huthwohl, G, et al. Leistungsfahigkeit der Filtertechnologien, Aktive Schadstoff-minderung im "Off-road" Bereich, May 11, 2000, paper and presentation (in German) with full English language translations.
Huthwohl, G, et al., Das CRT/SCRT-System als wirksame Abgasnachbehandlung fur Dieselmotoren, Aug. 1999 (in German) with full English language translation.
Huthwohl, G, et al., "Das SCRT.RTM. System—Die Kombination Partikelfilter mit SCR-Katalysator—ermoglicht die gleichzeitige Verminderung der Partikel—und NOx-Emmision bei Nutzfahzeug—dieselmotoren," Fachausstellung zum 3. Dresdner Motorenkolloquim, pp. 1-13, May 20-21, 1999 (in German) with full English language translation.
Horl, F., et al., Moglichkeiten zur Reduzierung der Abgasemissionen bei Bahndieselmotorem, Feb. 24-26, 1999 (in German) with full English language translation.
Kurzinformation zum SCRT-System, (in German) with full English language translation.
Muller, A., "Kampf gegen Ruβ und Stickoxide," Haudels Statt, Aug. 4, 1999 (in German) with full English language translation.
Weisweiler, W., "Karlsruher Professor erfindet Ammoniak-Generator," Unikath Jul. 1998, p. 7 (in German) with full English language translation.
"Karlsruher Professor erfindet Ammoniak-Generator," Presseinformation, Jun. 3, 1998 (in German) with full English language translation.
"Auch der Diesel hat Anlagen zum Sauber," Automobil Industrie May 1998, pp. 72-73 (in German) with full English language translation.
"Neues HJS-System gewohnt Stadtbussen das Rauchen ab," Mendener Nachrichten, Mar. 18, 1998 (in German) with full English language translation.
"Neuer DeNOx-Katalysator macht Diesel-Bus zum urbanen Saubermann," Apr. 3, 1998 (in German) with full English language translation.
Muller-Hellmann, A. Auf dem Weg zum,, "abgasfreien" Nahverkehrs-Fahrzeug (Bus and Schiene), pp. 38-48, 1999 (in German) with full English language translation.
Maurer, B., et al., "Model Gas Examinations with NH3 and Urea as Reducing Agent for Catalytic Reduction of NOx," MTZ Motortechnische Zeitschrift 60(1999) 5, pp. 2-5 (in German) with full English language translation.
Huthwohl, G., et al., "The SCRT System: The Utility vehicle diesel engine as a drive for low-emission vehicles: Test bench results and initial field test results," 20th International Vienna Motor Symposium (1998) (in German) with full English language translation.
Marquardt, K-J., et al., "An Exhaust Gas Aftertreatment System for Diesel Engines Based on SCR Technology," (1999) (in German) with full English language translation.
Stein, H.J., et al. "Potential to Reduce Emissions from Automotive and Industrial Diesel Engines," EUROMOT meeting, May 28, 1997.
German Federal Environmental Agency, "Comments Regarding the CRT Particle Filter (Continuous Regenerating Trap)," Aug. 21, 1996 (in German) with full English language translation.
SAE 980539; "VERT: Diesel Nano-Particulate Emissions: Properties and Reduction Strategies," Feb. 23-26, 1998.
SAE 952652, "Development of a Urea DeNOx Catalyst Concept for European Ultra-Low Emission Heavy Duty Diesel Engines," Nov. 13-15, 1995.
"SCRT Test Results Show Outstanding NOX, PM Reduction," Diesel Fuel News, Mar. 6, 2000.
SAE 2006-01-1529, "Development of DPF System for Commercial Vehicles—Pre-Catalyst Supporting to Active Regeneration (3rd Report)," Apr. 3-6, 2006.
SAE 2006-01-1091, "Catalyzed Soot Filters in Close Coupled Position for Passenger Vehicles," Apr. 3-6, 2006.
SAE 2006-01-0637, "DPF SCR Combinations Integrated Systems to Meet Future LDV Emission Limits," Apr. 3-6, 2006.
Joyner, R. W., et al., "Unusual structure and stability of iron-oxygen nano-clusters in Fe-ZSM-5 catalysts," Catalysis Letters 45(1997), 15-19.
Pirone, R., et al., "Transient behaviour of Cu-overexchanged ZSM-5 catalyst in NO decomposition," Catalysis Letters 430 (1997), 255-259.
Aoyama, N., et al., "Characterization of highly active silver catalyst for NOx reduction in lean-burning engine exhaust," Catalysis Letters 43 (1997) 249-253.
Torre-Abreu, C., et al., "Influence of cocation on catalytic activity of CuMOR catalysts for NO SCR by propene. Effect of water presence." Catalysis Letters 43 (1997) 25-29.
Hwang, I.C., et al., "The existence of dual Cu site involved in the selective catalytic reduction of NO with propene on Cu/ZSM-5," Catalysis Letters 42 (1996) 177-184.
Ham, S-W., et al., "Effect of oxygen on selective catalytic reduction of NO by NH3 over copper iron exchanged mordenite-type zeolite catalyst," Catalysis Letters 42 (1996) 35-40.
Visciglio, V., et al. "A new generation of Rhone-Poulenc DeNOx catalyst: DN 115," Catalysis Letters 40 (1996) 39-41.
Inaba, M., et al., "Silica-supported cobalt catalysts for the selective reduction of nitrogen moNOxide with propene," Catalysis Letters 39 (1996) 26-274.
Delahay, G., et al., "Catalytic behaviour of Cu/Zr02 and Cu/Zr02 (S04-2) in the reduction of nitric oxide by decane in oxygen-rich atmosphere," Catalysis Letters 39 (1996) 105-109.
Stakheev, A.Y., et al., "NO2 formation and its effect on the selective catalytic reduction of NO over Co/ZSM-5," Catalysis Letters 38 (1996) 271-278.
Takeda, H., et al., "Reaction of adsorbates derived from cyanuric acid on a Cu-MFI zeolite with nitrogen oxide and oxygen," Catalysis Letters 38 (1996) 21-25.
Burch, R., et al., "Adsorbate-assisted NO decomposition in NO reduction by C3H6 over Pt/Al2O3 catalysts under lean-burn conditions," Catalysis Letters 37 (1996) 51-55.
del Castillo, H.L., et al., "Selective catalytic reduction of NO by NH3 on titanium pillared montmorillonite," Catalysis Letters 36 (1996) 237-239.
Inaba, M., et al., "Cooperative effect of platinum and alumina for the selective reduction of nitrogen moNOxide with propane," Catalysis Letters 36 (1996) 223-227.
Catalytic Air Pollution Control: Commercial Technology, Heck, R.M., and R.J. Farrauto, Eds., 1995, Chapter 7, pp. 113-127 and Chapter 10, pp. 161-178.
"Emission Test Cycles: ECE R49," http://www.dieselnet.com/standards/cycles/ece--r49.html, (visited Nov. 15, 2000).
"SINOx fur Nutzfahzeuge," Siemens AG 1997.
The SINOx Catalyst System for Trucks, presented at Federal Environmental Agency. Jul. 1-2, 1996.

Satsuma, A., et al., "Low-temperature selective reduction of NO with propane over alkaline-exchanged mordenites," Catalysis Letters 45 (1997) 267-269.
"Head to head with Dr. Barry Cooper," Automotive, Sep. 2002, pp. 22-23.
Putz, R. "Further NOx Reduction in Diesel Engines," Der Nahverkehr [Mass Transit], Mar. 1998, pp. 12-17 (in German) with full English translation.
"SCRT system by HJS in Field Testing: 'The Lowest-emitting Diesel Bus in the World,'" Mass Transit News, Mar. 1998 (in German) with full English language translation.
Huthwohl, G., et al., "The SCRT System: The utility vehicle diesel engine as a drive for low-emission vehicles using efficient exhaust gas treatment" 20th International Vienna Motor Symposium (1998) (in German) with full English language translation.
Luders, H., et al., "An Urea Lean NOx Catalyst System for Light Duty Vehicles," Fuels and Lubricants, Meetings and Exposition, Toronto, Ontario Oct. 16-19, 1995, SAE Paper 952493.
"Long-term Studies of the SINOx Catalyst in Road Testing," NKW Partner, Jan. 1997, pp. 79-81 (with full English language translation).
"Cutting diesel NOx 'downstream,'" Paramins Post, Winter Jul. 1996, p. 5.
Huthwohl, G., "Particulate Traps & SCR Systems," Palais des Nations Geneva, Ad-hoc Particulate Meeting, May 25, 1999.
Opposition submission by Johnson Matthey filed on Jan. 28, 2002 to EP 0758713 to Toyota.
Hawker, P.N., "System Containing Platinum Catalyst and Filter Unit Removes Particulate From Diesel Exhaust." Platinum Metals Rev., 1995, 39 (1), pp. 2-8.
SAE 8900404, "Role of NO in Diesel Particulate Emission Control," by Cooper B.J. and J.E. Thoss, presented during the International Congress & Exposition, Detroit, Michigan, Feb. 27-Mar. 3, 1989.
Goldenberg, E. et al, "Depolution des Gas d'Eschappement des Moteurs Diesel Au Moyen de Pots Catalytiques," Revue de l'Institut Francais du Petrole vol. 38, No. 6 Nov.-Dec. 1983, pp. 793-805 (including English translation).
SAE 830087, "Particulate Control Systems for Diesel Engines Using Catalytically Coated and Uncoated Traps with Consideration of Regeneration Techniques," by Oser P and U, Thomas, presented during the International Congress & Exposition, Detroit, Michigan, Feb. 28-Mar. 4, 1983.
Emission Test Cycles ECE R49, http://www.dieselnet.com/standards/cycles/ece--r49.html (visited Nov. 15, 2000).
Emission Test cycles European Transient Cycle (ETC), http://www.dieselnet.com/standards/cycles/etc/html (visited Jan. 16, 2002).
Graphs showing the exhaust gas temperature detected upstream of an oxidation catalyst for a Volvo TD123 heavy-duty diesel engine, including an exhaust system comprising the apparatus of D1, run over the ETC emission test cycle.
Graph showing the exhaust gas temperature detected upstream and downstream of a diesel oxidation catalyst for VW 1.9 litre TD1 engine run over the ECE 15 + EUDE test cycle.
Reply by Toyota filed Sep. 19, 2002 to Opposition submission by JM to EP 0758713, including claim auxiliary requests.
Arai, H., and M. Machida, "Thermal stabilization of catalyst supports and their application to high-temperature catalytic combustion," Applied Catalysis A: General 138 (1996) 161-176.
Katoh, K., et al. "Development of NOx Storage-reduction 3-way Catalyst System of Lean-burn Engines," Toyota Technical Review vol. 44 No. 2, Mar. 1995, 27-32.
Schaper, H., et al. "The influence of lanthanum oxide on the thermal stability of gamma alumina catalysts supports," Applied Catalyst, 7 (1983) 211-220.
Machida, M., et al. "Effect of Additives on the Surface Area of Oxide Supports for Catalytic Combination," Journal of Catalysis 103, 385-393 (1985).
Summons to Attend Oral Proceedings mailed Nov. 18, 2002.
Toyota's Response to Summons filed Feb. 25, 2003, including claim auxiliary requests.
Johnson Matthey's Response to Summons filed Feb. 25, 2003.
Minutes of the Oral Proceedings before the Opposition Division on Mar. 25, 2003.
Interlocutory Decision of the Opposition mailed Apr. 15, 2003.
Appeal Request/Brief by Toyota filed Aug. 8, 2003.
Appeal Request/Brief by Johnson Matthey filed Aug. 15, 2003.
Toyota's Reply to Johnson Matthey's Appeal Request/Brief filed Dec. 16, 2003.
Johnson Matthey's Reply to Toyota's Appeal Request/Brief filed May 20, 2004.
Heck R. M., et al. "Catalytic Air Pollution Control—Commercial Technology," John Wiley & Sons Inc., p. 75 (1995).
Miyoshi N., et al. "Development of New Concept Three-Way Catalyst for Automotive Lean-Burn Engines," International Congress and Exposition, Detroit, Michigan, Feb. 27-Mar. 2, 1995, SAE 950809.
Toyota's Response to Johnson Matthey's Reply filed Sep. 28, 2004.
Summons to Attend Oral Proceedings concerning Appeal mailed Dec. 23, 2004.
Toyota's Response to Summons filed Mar. 8, 2005, including claim auxiliary requests.
Johnson Matthey's Response to Summons filed Mar. 7, 2005.
Minutes of the Oral Proceeding before the Technical Board of Appeal Apr. 8, 2005.
Decision of the Technical Board of Appeal mailed Jun. 27, 2005.
Toyota's Response to EPO Communication filed Dec. 6, 2005.
Johnson Matthey's Reply to Toyota's Response filed Feb. 24, 2006.
EPO Communication pursuant to 101(2) and 58(1) mailed Mar. 14, 2006.
Toyota's Response to EPO Communication pursuant to 101(2) and 58(1) of EPC filed Apr. 24, 2006.
Interlocutory Decision by Opposition Division mailed May 15, 2007 following Appeal to Board.
Hawker, P., "SCR catalysts for Heavy Duty Engines," presented at the UBA Conference in Berlin on Jul. 1-2, 1996.
Havenith, C., and R.P. Verbeek, "Transient Performance of a Urea deNOx Catalyst for Low Emissions Heavy-Duty Diesel Engines," International Congress & Exposition, Detroit, Michigan, Feb. 24-27, 1997, SAE 970185.
Huthwohl, G, et al., "Das CRT/SCRT-System als wirksame Abgasnachbehandlung fur Dieselmotoren," Aug. 1999, presentation (in German) with English language translation.
Huthwohl, G., "Neueste Entwicklungen im Bereich der Abgasnachbehandlung (CRT und SCRT)," Tagung zum Thema Umweltschutz im Nahverkehr, Nov. 5, 1998 (in German) with full English language translation.
Maurer, B., "Neueste Entwicklungen im Bereich der Abgasnachbehandlung (CRT und SCRT)," Tagung zum Thema Umweltschutz im Nahverkehr, Nov. 5, 1998, presentation (in German) with full English language translation.
Huthwohl, G., Der Dieselmotor Ein gleichzeitig wirtschaftliches und umweltfreundliches Antriebsaggregat durch Abgasreinigung, Nahverkehrsforum in Paderborn, Mar. 11-12, 1998 (in German) with full English language translation.
Huthwohl, G., Der Dieselmotor Ein gleichzeitig wirtschaftliches und umweltfreundliches Antriebsaggregat durch Abgasreinigung, Nahverkehrsforum in Paderborn, Mar. 11-12, 1998, presentation (in German) with full English language translation.
Opposition submission to EP 1194681 to Johnson Matthey filed by Umicore on Sep. 28, 2005 (in German) with full English translation.
Sittig, M., "Automotive Pollution Control Catalysts and Devices", Noyes Data Corporation, Park Ridge, New Jersey, USA, 1997, pp. 83-84.
Press Release from Citroen, Jul. 1999, http://www.citroen.mb.ca/citroenet/html/number/5thstroke.html.
Johnson Matthey's Response to Umicore's Opposition of EP 1194681 filed Mar. 28, 2006.
Umicore's Reply to Johnson Matthey's Response filed Nov. 20, 2006 (in German) with full English language translation; and Johnson Matthey's Reply to Umicore's Reply filed Dec. 20, 2006.
International Preliminary Examination Report PCT/GB00/02342 (WO 01/04466 A1).
Jochheim, Jorgen; "The Dependence of the Conversion Performance of Different Types of Diesel Catalysts as a Function of Operation Properties" Vom Fachbereich Chemie der Universitat Hannover zur Erlangung des Grades, published Feb. 4, 1998.
"Methods of De-NOx-ing," extract from Jorgen Jochheim: Reduction of Nitrogen Oxides under Oxidising Conditions, pp. 3-4.[2].

"SCRT-System fur Linienbus se" (in German)[3].

"Durch das SCRT-System von HJS weltweit der sauberste Diesel-Bus" (in German)[4].

Huthwohl, G., et al. "Emissionen von Dieselmotoren im Nahverhehr und Moglichkeiten der Emmissionsverminderung," (in German)[5].

Appeal Brief by Umicore AG & Co. KG (Opponent), including Exhibits 1 and 2, filed Apr, 10, 2008 in responses to the European Opposition Division's Decision regarding European Patent No. 1054722 (in German with English language translation).

Response by Johnson Matthey PLC et al. (Patent co-Proprietors), including noted Auxiliary Requests and attachments, to the Opponent's Statement on Grounds of Appeal regarding European Patent No. 1054722 (Response filed Aug. 19, 2008).

Mul, Guido, excerpts from the doctoral thesis "Catalytic Diesel Exhaust Purification, A Drift Spectroscopic and Mechanistic Study of Soot Oxidation" submitted to the Technical University in Delft in the Netherlands on Mar. 25, 1997.

P. Zelenka, "Abgasnachbehandlung im Hinblick auf die Erfullung zukunftiger Emissionsgrenzwerte [Exhaust Gas Aftertreatment Systems with Regard to Meeting Future Emissions Limits]" in: Dieselmotorentechnik 96—Aktueller Stand und Entwicklungstendenzen [Diesel Engine Technology 96—Current Status and Development Trends], Section 14, pp. 216-236, vol. 505, publisher Prof, dr.-Ing. Wilfried J. Bartz, Technical Academy Esslingen (in German English language translation).

Office Action of Jul. 6, 2012, received in connection with Japanese Patent Application No. 2010-250064 (English language translation provided).

Request for Administration Review of Norwegian Patent No. 321171 filed by BASF (English translation provided).

Avila, Catalyst for NOx Removal in Nitric-Acid Plant Gaseous Effluents, Atmospheric Environment, vol. 27A, No. 3, pp. 443-447, 1993. Third-Party Presentation of Publications and Comments in related Japanese Application 201 0-250064 (English Translation).

Request for Inter Partes Rexamination of U.S. Patent No. 6,805,849.
Request for Inter Partes Reexamination of U.S. Patent No. 7,498,010.
Request for Inter Partes Reexamination of U.S. Patent No. 8,142,747.
Avila, Catalyst for NOx Removal in Nitric-Acid Plant Gaseous Effluents, Atmospheric Environment, vol. 27A, No. 3, pp. 443-447, Perganon Press Ltd., 1993 ("Avila").

Feeley et al., Abatement of NOx from Diesel Engines: Status and Technical Challenges, SAE Technical Paper Series 950747 (1995) ("Feeley").

Walker et al., Development of an Ammonia/SCR NOx Reduction System for a Heavy Duty Natural Gas Engine, Society of Automotive Engineers (Diesel Combustion, Emissions and Exhaust Aftertreatment (SP-931), pp. 171-181, 1992 ("Walker").

Board Decision of EPO Revoking EP Counterpart to U.S. 7,498,010.
Board Decision of EPO Revoking EP Counterpart to U.S. 8,142,747.
Amendment filed in pending JP Application 2010-250064 (with English Translation) addressing applied references including JP H05-214923.

Opposition filing in Inter Partes Reexamination No. 95/002211.
Opposition filing in Inter Partes Reexamination No. 95/002217.
Opposition filing in Inter Partes Reexamination No. 95/002220.
Feb. 15, 2012, Letter regarding a third party "Presentation of Information" in pending Japanese patent application No. 2010-250064 citing JP Utility Model Laid-Open Publication No. 63-38620 (Mar. 1988) and JP Patent Laid-Open Publication No. H1-318715 (Dec. 1989).

Submission of Publications and the Like filed in Japanese patent application No. 2010-250064.

Feb. 19, 2013, Decision to Grant Japanese patent application No. 2010-250064.

Automotive Technology Series 1 Environmental Technologies for Automotive Motors, p. 59, section 3.5.3 Lean NOx Catalysts.

* cited by examiner

CATALYTIC REDUCTION OF $NO_x$

CROSS REFERENCE TO RELATED APPLICATIONS

This application is a continuation of U.S. application Ser. No. 12/380,414, filed Feb. 27, 2009, which is a continuation of U.S. application Ser. No. 10/886,778, filed Jul. 8, 2004, which is a divisional application of U.S. application Ser. No. 09/601,964, filed Jan. 9, 2001, now U.S. Pat. No. 6,805,849, which is the U.S. National Phase of International Application No. PCT/GB1999/000292, filed Jan. 28, 1999, and which claims the benefit of priority from British Application No. 9802504.2, filed Feb. 6, 1998. These applications, in their entirety, are incorporated herein by reference.

SUMMARY OF THE INVENTION

The present invention concerns improvements in selective catalytic reduction of $NO_x$ in waste gas streams such as diesel engine exhausts or other lean exhaust gases such as from gasoline direct injection (GDI).

BACKGROUND OF THE INVENTION

The technique named SCR (Selective Catalytic Reduction) is well established for industrial plant combustion gases, and may be broadly described as passing a hot exhaust gas over a catalyst in the presence of a nitrogenous reductant, especially ammonia or urea. This is effective to reduce the $NO_x$ content of the exhaust gases by about 20-25% at about 250° C., or possibly rather higher using a platinum catalyst, although platinum catalysts tend to oxidise $NH_3$ to $NO_x$ during higher temperature operation. We believe that SCR systems have been proposed for $NO_x$ reduction for vehicle engine exhausts, especially large or heavy duty diesel engines, but this does require on-board storage of such reductants, and is not believed to have met with commercial acceptability at this time.

We believe that if there could be a significant improvement in performance of SCR systems, they would find wider usage and may be introduced into vehicular applications. It is an aim of the present invention to improve significantly the conversion of $NO_x$ in a SCR system, and to improve the control of other pollutants using a SCR system.

DETAILED DESCRIPTION OF THE INVENTION

Figure 1:
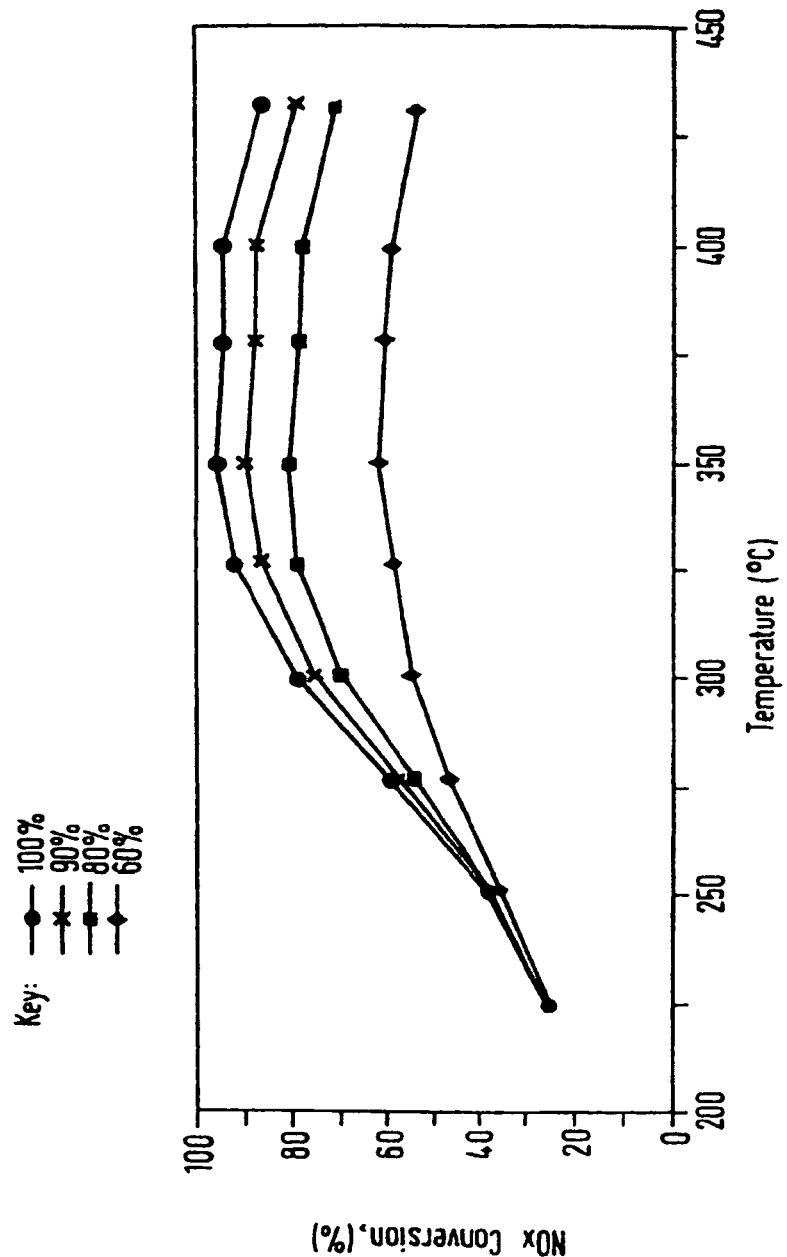
FIG. 1 is a graph plotting percentage $NO_x$ conversion against temperature resulting from Test 1.

Accordingly, the present invention provides an improved SCR catalyst system, comprising in combination and in order, an oxidation catalyst effective to convert NO to $NO_2$, a particulate filter, a source of reductant fluid and downstream of said source, an SCR catalyst.

The invention further provides an improved method of reducing $NO_x$ in gas streams containing NO and particulates comprising passing such gas stream over an oxidation catalyst under conditions effective to convert at least a portion of NO in the gas stream to $NO_2$, removing at least a portion of said particulates, adding reductant fluid to the gas stream containing enhanced $NO_2$ to form a gas mixture, and passing the gas mixture over an SCR catalyst.

Although the present invention provides, at least in its preferred embodiments, the opportunity to reduce very significantly the $NO_x$ emissions from the lean (high in oxygen) exhaust gases from diesel and similar engines, it is to be noted that the invention also permits very good reductions in the levels of other regulated pollutants, especially hydrocarbons and particulates.

The invention is believed to have particular application to the exhausts from heavy duty diesel engines, especially vehicle engines, e.g., truck or bus engines, but is not to be regarded as being limited thereto. Other applications might be LDD (light duty diesel), GDI, CNG (compressed natural gas) engines, ships or stationary sources. For simplicity, however, the majority of this description concerns such vehicle engines.

We have surprisingly found that a "pre-oxidising" step, which is not generally considered necessary because of the low content of CO and unburnt fuel in diesel exhausts, is particularly effective in increasing the conversion of $NO_x$ to $N_2$ by the SCR system. We also believe that minimising the levels of hydrocarbons in the gases may assist in the conversion of NO to $NO_2$. This may be achieved catalytically and/or by engine design or management. Desirably, the $NO_2$/NO ratio is adjusted according to the present invention to the most beneficial such ratio for the particular SCR catalyst and CO and hydrocarbons are oxidized prior to the SCR catalyst. Thus, our preliminary results indicate that for a transition metal/zeolite SCR catalyst it is desirable to convert all NO to $NO_2$, whereas for a rare earth-based SCR catalyst, a high ratio is desirable providing there is some NO, and for other transition metal-based catalysts gas mixtures are notably better than either substantially only NO or $NO_2$. Even more surprisingly, the incorporation of a particulate filter permits still higher conversions of $NO_x$.

The oxidation catalyst may be any suitable catalyst, and is generally available to those skilled in art. For example, a Pt catalyst deposited upon a ceramic or metal through-flow honeycomb support is particularly suitable. Suitable catalysts are, e.g., $Pt/Al_2O_3$ catalysts, containing 1-150 g Pt/ft$^3$ (0.035-5.3 g Pt/liter) catalyst volume depending on the $NO_2$/NO ratio required. Such catalysts may contain other components providing there is a beneficial effect or at least no significant adverse effect.

The source of reductant fluid conveniently uses existing technology to inject fluid into the gas stream. For example, in the tests for the present invention, a mass controller was used to control supply of compressed $NH_3$, which was injected through an annular injector ring mounted in the exhaust pipe. The injector ring had a plurality of injection ports arranged around its periphery. A conventional diesel fuel injection system including pump and injector nozzle has been used to inject urea by the present applicants. A stream of compressed air was also injected around the nozzle; this provided good mixing and cooling.

The reductant fluid is suitably NH3, but other reductant fluids including urea, ammonium carbamate and hydrocarbons including diesel fuel may also be considered. Diesel fuel is, of course, carried on board a diesel-powered vehicle, but diesel fuel itself is a less selective reductant than $NH_3$ and is presently not preferred.

Suitable SCR catalysts are available in the art and include Cu-based and vanadia-based catalysts. A preferred catalyst at present is a $V_2O_5/WO_3/TiO_2$ catalyst, supported on a honeycomb through-flow support. Although such a catalyst has shown good performance in the tests described hereafter and is commercially available, we have found that sustained high temperature operation can cause catalyst deactivation. Heavy duty diesel engines, which are almost exclusively turbocharged, can produce exhaust gases at greater than 500° C. under conditions of high load and/or high speed, and such temperatures are sufficient to cause catalyst deactivation.

In one embodiment of the invention, therefore, cooling means is provided upstream of the SCR catalyst. Cooling means may suitably be activated by sensing high catalyst temperatures or by other, less direct, means, such as determining conditions likely to lead to high catalyst temperatures. Suitable cooling means include water injection upstream of the SCR catalyst, or air injection, for example utilizing the engine turbocharger to provide a stream of fresh intake air by-passing the engine. We have observed a loss of activity of the catalyst, however, using water injection, and air injection by modifying the turbocharger leads to higher space velocity over the catalyst which tends to reduce NO conversion. Preferably, the preferred SCR catalyst is maintained at a temperature from 160° C. to 450° C.

We believe that in its presently preferred embodiments, the present invention may depend upon an incomplete conversion of NO to $NO_2$. Desirably, therefore, the oxidation catalyst, or the oxidation catalyst together with the particulate trap if used, yields a gas stream entering the SCR catalyst having a ratio of NO to $NO_2$ of from about 4:1 to about 1:3 by volume, for the commercial vanadia-type catalyst. As mentioned above, other SCR catalysts perform better with different $NO/NO_2$ ratios. We do not believe that it has previously been suggested to adjust the $NO/NO_2$ ratio in order to improve NO reduction.

The present invention incorporates a particulate trap downstream of the oxidation catalyst. We discovered that soot-type particulates may be removed from a particulate trap by "combustion" at relatively low temperatures in the presence of $NO_2$. In effect, the incorporation of such a particulate trap serves to clean the exhaust gas of particulates without causing accumulation, with resultant blockage or back-pressure problems, whilst simultaneously reducing a proportion of the NOR. Suitable particulate traps are generally available, and are desirably of the type known as wall-flow filters, generally manufactured from a ceramic, but other designs of particulate trap, including woven knitted or non-woven heat-resistant fabrics, may be used.

It may be desirable to incorporate a clean-up catalyst downstream of the SCR catalyst, to remove any $NH_3$ or derivatives thereof which could pass through unreacted or as by-products. Suitable clean-up catalysts are available to the skilled person.

A particularly interesting possibility arising from the present invention has especial application to light duty diesel engines (car and utility vehicles) and permits a significant reduction in volume and weight of the exhaust gas after-treatment system, in a suitable engineered system.

EXAMPLES

Several tests have been carried out in making the present invention. These are described below, and are supported by results shown in graphical form in the attached drawings.

A commercial 10 liter turbocharged heavy duty diesel engine on a test-bed was used for all the tests described herein.

Test 1—(Comparative)

A conventional SCR system using a commercial $V_2O_5/WO_3/TiO_2$ catalyst, was adapted and fitted to the exhaust system of the engine. $NH_3$ was injected upstream of the SCR catalyst at varying ratios. The $NH_3$ was supplied from a cylinder of compressed gas and a conventional mass flow controller used to control the flow of $NH_3$ gas to an experimental injection ring. The injection ring was a 10 cm diameter annular ring provided with 20 small injection ports arranged to inject gas in the direction of the exhaust gas flow. $NO_x$ conversions were determined by fitting a $NO_x$ analyser before and after the SCR catalyst and are plotted against exhaust gas temperature in FIG. 1. Temperatures were altered by maintaining the engine speed constant and altering the torque applied.

A number of tests were run at different quantities of $NH_3$ injection, from 60% to 100% of theoretical, calculated at $1:1 NH_3/NO$ and $4:3 NH_3/NO_2$. It can readily be seen that at low temperatures, corresponding to light load, conversions are about 25%, and the highest conversions require stoichiometric (100%) addition of $NH_3$ at catalyst temperatures of from 325 to 400° C., and reach about 90%. However, we have determined that at greater than about 70% of stoichiometric $NH_3$ injection, $NH_3$ slips through the SCR catalyst unreacted, and can cause further pollution problems.

Test 2 (Comparative)

Figure 2:
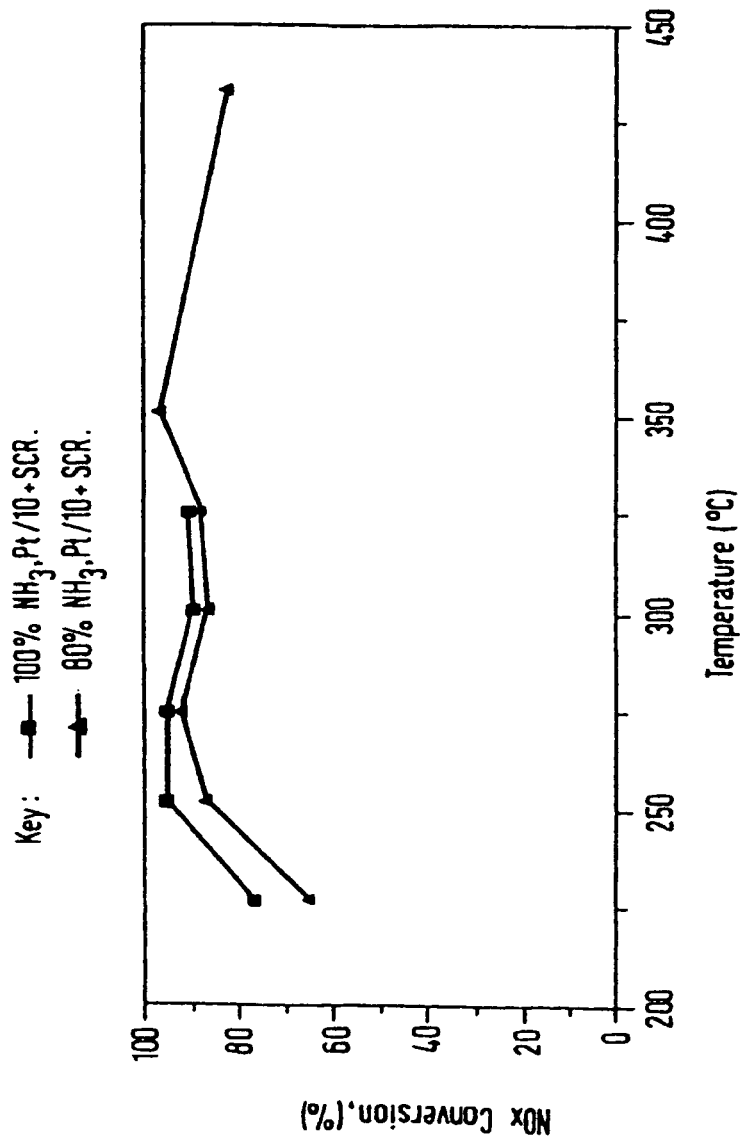
FIG. 2 is a graph plotting percentage $NO_x$ conversion against temperature resulting from Test 2.

The test rig was modified by inserting into the exhaust pipe upstream of the $NH_3$ injection, a commercial platinum oxidation catalyst of 10.5 inch diameter and 6 inch length (26.67 cm diameter and 15.24 cm length) containing log $Pt/ft^3$ (=0.35 g/liter) of catalyst volume. Identical tests were run, and it was observed from the results plotted in FIG. 2, that even at 225° C., the conversion of $NO_x$ has increased from 25% to >60%. The greatest conversions were in excess of 95%. No slippage of $NH_3$ was observed in this test nor in the following test.

Test 3

Figure 3:
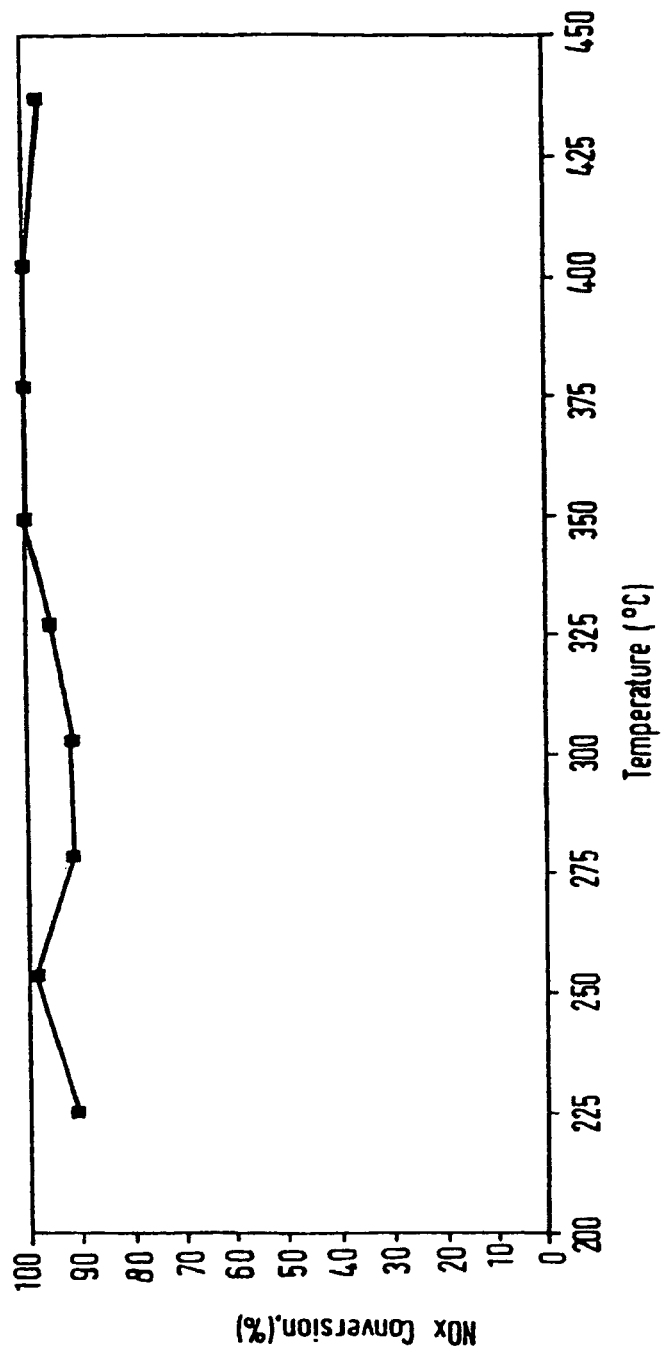
FIG. 3 is a graph plotting percentage $NO_x$ conversion against temperature resulting from Test 3.

The test rig was modified further, by inserting a particulate trap before the $NH_3$ injection point, and the tests run again under the same conditions at 100% $NH_3$ injection and a space velocity in the range 40,000 to 70,000 $hr^{-1}$ over the SCR catalyst. The results are plotted and shown in FIG. 3. Surprisingly, there is a dramatic improvement in $NO_x$ conversion, to above 90% at 225° C., and reaching 100% at 350° C. Additionally, of course, the particulates, which are the most visible pollutant from diesel engines, are also controlled.

Test 4

Figure 4:
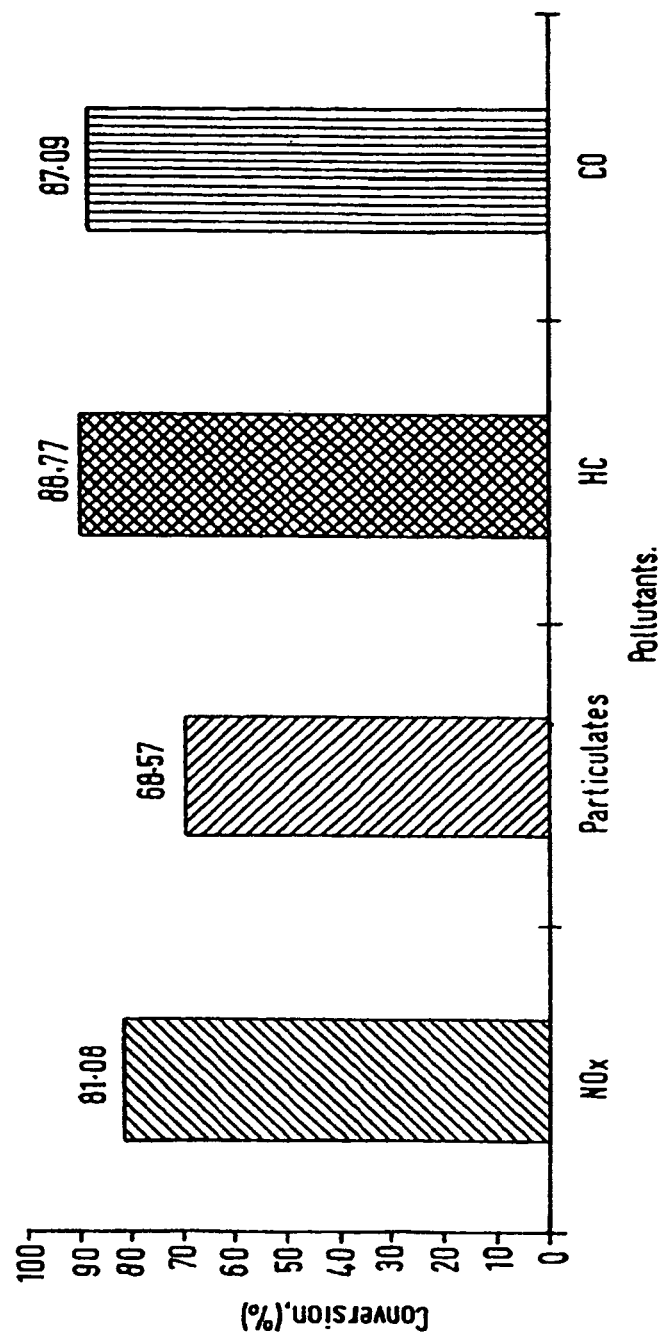
FIG. 4 is a bar graph showing percentage conversion of pollutants [$NO_x$, particulates, hydrocarbons (HC) and carbon monoxide (CO)] resulting from Test 4.

An R49 test with 80% $NH_3$ injection was carried out over a $V_2O_5/WO_3/TiO_2$ SCR catalyst. This gave 67% particulate, 89% HC and 87% $NO_x$ conversion; the results are plotted in FIG. 4.

Additionally tests have been carried out with a different diesel engine, and the excellent results illustrated in Tests 3 and 4 above have been confirmed.

The results have been confirmed also for a non-vanadium SCR catalyst.

The invention claimed is:

1. A method of reducing particulates and $NO_x$ in an exhaust gas stream of a diesel engine, comprising: (1) converting at least a portion of the NO in the gas stream to $NO_2$ on an oxidation catalyst; (2) passing the gas stream through a particulate trap to trap at least a portion of the particulates from the gas stream; (3) reducing the proportion of $NO_2$ in the gas stream by combusting a portion of the trapped particulates in the presence of $NO_2$; (4) adding reductant fluid to the gas stream to form a mixed composition; and (5) passing the mixed composition over the SCR catalyst under $NO_x$ reduction conditions.

2. The method of claim 1, wherein: the ratio of NO to $NO_2$ in the gas stream, prior to adding the reductant fluid, is from about 4:1 to about 1:3 by volume.

3. The method of claim 1, wherein: the particulate trap comprises a wall-flow filter.

4. A method of reducing particulates and $NO_x$ in an exhaust gas stream of a diesel engine, comprising: (1) converting at least a portion of the NO in the gas stream to $NO_2$ on an oxidation catalyst; (2) passing the converted gas stream through a particulate trap to trap at least a portion of the particulates from the gas stream; (3) reducing the proportion of $NO_2$ in the converted gas stream by combusting a portion of the trapped particulates in the-presence of $NO_2$; (4) adding reductant fluid to the gas stream to form a gas mixture; and (5) passing the gas mixture over the SCR catalyst under $NO_x$ reduction conditions.

5. The method of claim 4, wherein: the ratio of NO to $NO_2$ in the gas stream, prior to adding the reductant fluid, is from about 4:1 to about 1:3 by volume.

6. The method of claim 4, wherein: the particulate trap comprises a wall-flow filter.

7. The method of claim 1, wherein the reductant fluid is selected from the group consisting of ammonia, ammonium carbamate and urea.

8. The method of claim 1, wherein the reductant fluid in $NH_3$.

9. The method of claim 1, wherein the reductant fluid in urea.

10. The method of claim 1, wherein the reductant fluid being added to the gas stream prior to entering the SCR catalyst is urea.

11. The method of claim 1, wherein the oxidation catalyst is a platinum catalyst carried on a through-flow honeycomb support.

12. The method of claim 1, wherein the gas stream is cooled before reaching the SCR catalyst.

13. The method of claim 1, wherein the NO to $NO_2$ ratio of the gas mixture is adjusted to a level pre-determined to be optimum for the SCR catalyst, by oxidation of NO over the oxidation catalyst.

14. The method of claim 11, wherein the NO to $NO_2$ ratio of the gas mixture is adjusted to a level pre-determined to be optimum for the SCR catalyst, by oxidation of NO over the oxidation catalyst.

15. The method of claim 14, wherein the ratio of $NO:NO_2$ leaving the oxidation catalyst is adjusted to about 4:3.

16. The method of claim 1, wherein the SCR catalyst is maintained at a temperature from 160° C. to 450° C.

17. The method of claim 1, wherein the SCR catalyst includes a component selected from the group consisting of a transition metal and a rare-earth metal.

18. The method of claim 1, wherein the SCR catalyst is selected from the group consisting of transition metal/zeolite catalysts, rare earth-based catalysts and transition metal catalysts.

19. The method of claim 1, wherein the SCR catalyst comprises a transition metal/zeolite catalyst.

20. The method of claim 1, further comprising the step of contacting the gas mixture leaving the SCR catalyst with a clean-up catalyst to remove $NH_3$ or derivatives thereof.

21. The method of claim 1, wherein the space velocity of the exhaust gas over the SCR catalyst is in the range 40,000 to 70,000 $h^{-1}$.

22. The method of claim 1, wherein the particulates are removed without causing accumulation and resulting blockage and back pressure problems.

23. The method of claim 1, wherein the particles are removed from the particulate trap by combustion in the presence of $NO_2$.

24. The method of claim 1, wherein the particulate trap is manufactured from ceramic.

25. The method of claim 1, wherein the particulate trap is manufactured from woven knitted heat resistant fabrics.

26. The method of claim 1, wherein the particulate trap is manufactured from non-woven heat resistant fabrics.

27. The method of claim 1, wherein the gas stream comprises exhaust from a heavy duty diesel engine.

28. The method of claim 1, wherein the gas stream comprises exhaust from a light duty diesel engine.

29. The method of claim 1, wherein $NH_3$ or derivatives thereof which pass unreacted or as by-products through the SCR catalyst are removed by means of a clean-up catalyst arranged downstream of the SCR catalyst.

30. The method of claim 4, wherein the reductant fluid is selected from the group consisting of ammonia, ammonium carbamate and urea.

31. The method of claim 4, wherein the reductant fluid is $NH_3$.

32. The method of claim 4, wherein the reductant fluid is urea.

33. The method of claim 4, wherein the reductant fluid being added to the gas stream prior to entering the SCR catalyst is urea.

34. The method of claim 4, wherein the oxidation catalyst is a platinum catalyst carried on a through-flow honeycomb support.

35. The method of claim 4, wherein the gas stream is cooled before reaching the SCR catalyst.

36. The method of claim 4, wherein the NO to $NO_2$ ratio of the gas mixture is adjusted to a level pre-determined to be optimum for the SCR catalyst, by oxidation of NO over the oxidation catalyst.

37. The method of claim 34, wherein the NO to $NO_2$ ratio of the gas mixture is adjusted to a level pre-determined to be optimum for the SCR catalyst, by oxidation of NO over the oxidation catalyst.

38. The method of claim 37, wherein the ratio of $NO:NO_2$ leaving the oxidation catalyst is adjusted to about 4:3.

39. The method of claim 4, wherein the SCR catalyst is maintained at a temperature from 160° C. to 450° C.

40. The method of claim 4, wherein the SCR catalyst includes a component selected from the group consisting of a transition metal and a rare-earth metal.

41. The method of claim 4, wherein the SCR catalyst is selected from the group consisting of transition metal/zeolite catalysts, rare earth-based catalysts and transition metal catalysts.

42. The method of claim 4, wherein the SCR catalyst comprises a transition metal/zeolite catalyst.

43. The method of claim 4, further comprising the step of contacting the gas mixture leaving the SCR catalyst with a clean-up catalyst to remove $NH_3$ or derivatives thereof.

44. The method of claim 4, wherein the space velocity of the exhaust gas over the SCR catalyst is in the range 40,000 to 70,000 h$^{-1}$.

45. The method of claim 4, wherein the particulates are removed without causing accumulation and resulting blockage and back pressure problems.

46. The method of claim 4, wherein the particles are removed from the particulate trap by combustion in the presence of $NO_2$.

47. The method of claim 4, wherein the particulate trap is manufactured from ceramic.

48. The method of claim 4, wherein the particulate trap is manufactured from woven knitted heat resistant fabrics.

49. The method of claim 4, wherein the particulate trap is manufactured from non-woven heat resistant fabrics.

50. The method of claim 4, wherein the gas stream comprises exhaust from a heavy duty diesel engine.

51. The method of claim 4, wherein the gas stream comprises exhaust from a light duty diesel engine.

52. The method of claim 4, wherein $NH_3$ or derivatives thereof which pass unreacted or as by-products through the SCR catalyst are removed by means of a clean-up catalyst arranged downstream of the SCR catalyst.

\* \* \* \* \*